March 28, 1939. J. MILLS 2,151,710
METHOD OF AND APPARATUS FOR EXTRACTING RIND OIL FROM CITRUS FRUITS
Filed Sept. 30, 1935  3 Sheets-Sheet 1
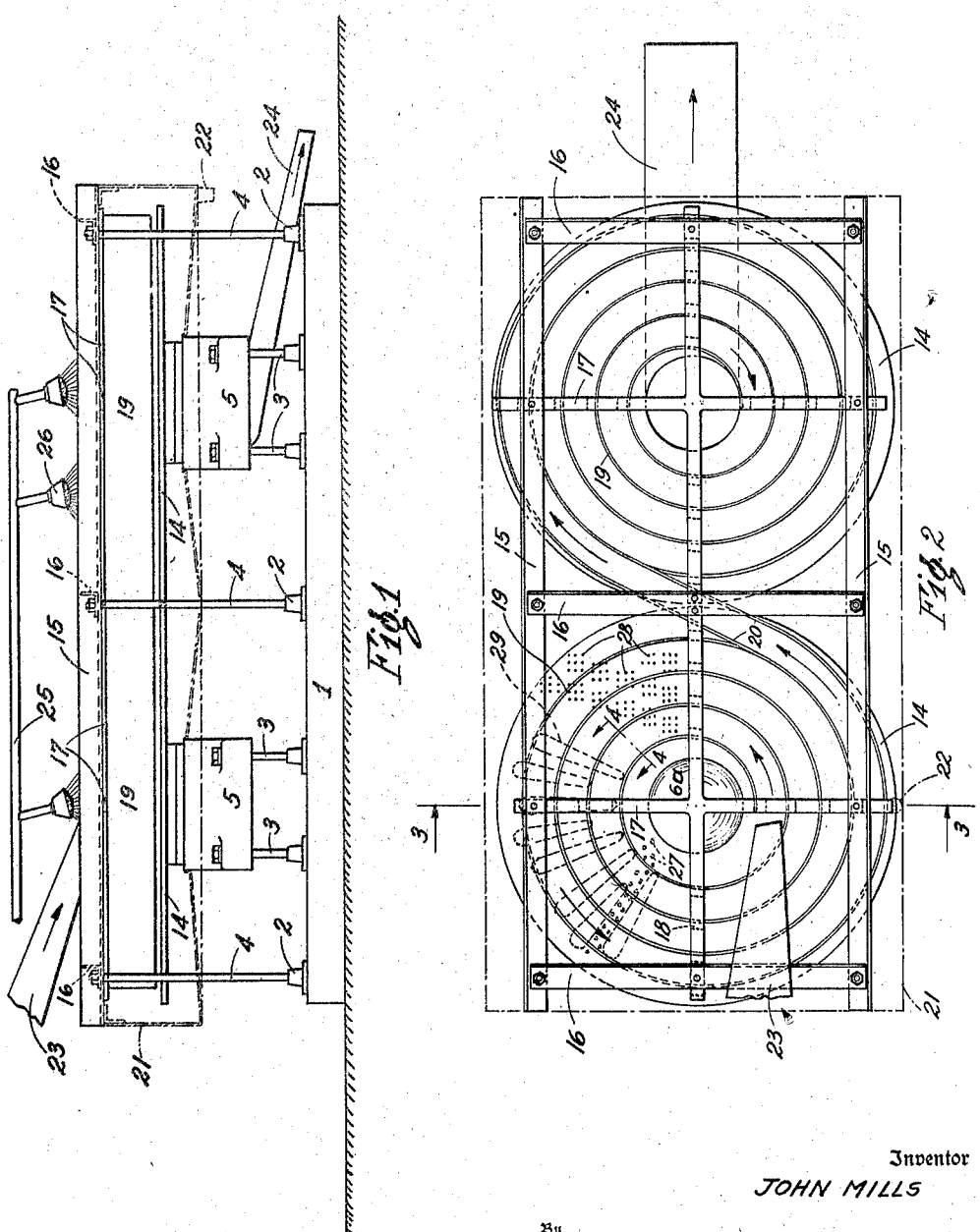
Inventor
JOHN MILLS
By Richey & Watts
Attorneys

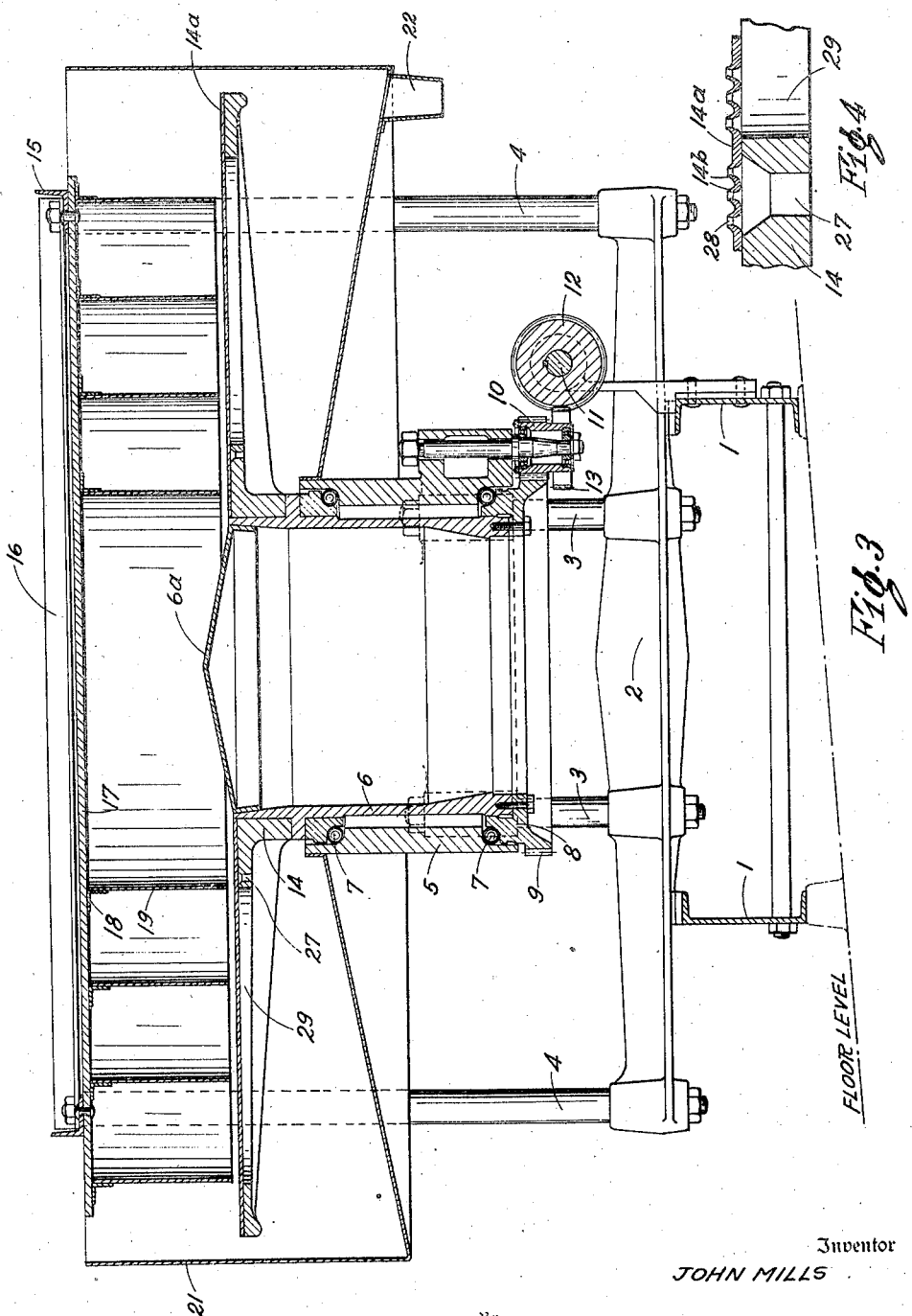

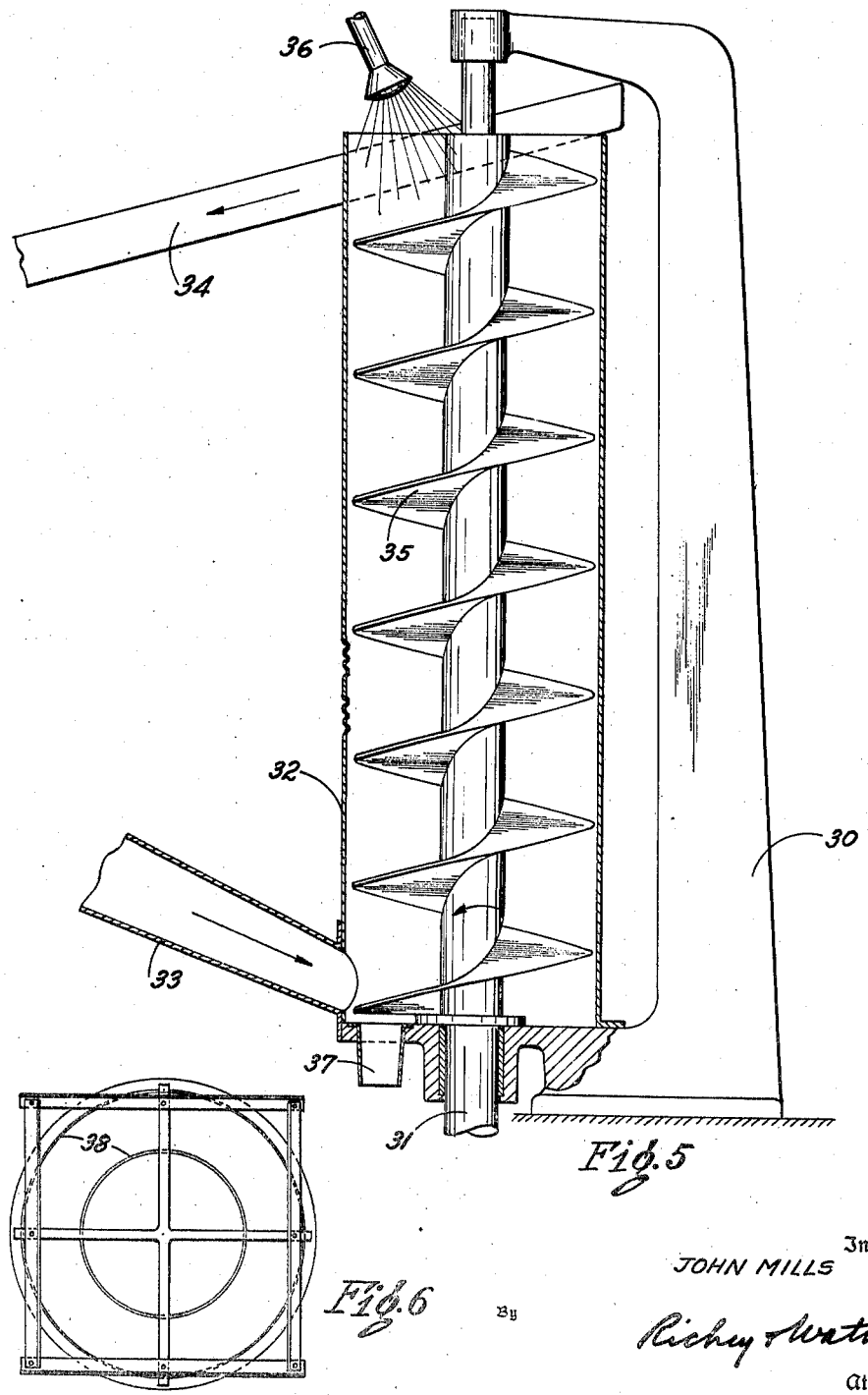

Patented Mar. 28, 1939

2,151,710

UNITED STATES PATENT OFFICE 2,151,710

METHOD OF AND APPARATUS FOR EXTRACTING RIND OIL FROM CITRUS FRUITS

John Mills, Santa Ana, Calif., assignor to Crown Can Company, Philadelphia, Pa., a corporation of Pennsylvania Application September 30, 1935, Serial No. 42,870

19 Claims. (Cl. 87—28)

This invention relates to the art of extracting rind oil from citrus fruits. It is particularly concerned with new and improved apparatus and with a new and improved method for treating whole citrus fruits to remove the rind oil from the oil cells of the fruit and to recover such oil.

Heretofore methods have been proposed to extract rind oil from citrus fruits but, so far as I am aware, each such method has involved certain important disadvantages which militated greatly against commercial use of the method.

One method which has been proposed for extracting rind oil consisted of cutting the whole citrus fruit into two or more parts, removing the juice from the juice cells and then squeezing the remaining parts which consisted primarily of the outer covering of the fruit to press out the rind oil. According to another proposed method the fruit was peeled and the hull was pressed between rollers. These methods resulted in a low yield of rind oil, partly because much of the oil was absorbed by the "albedo" or white part of the hull or fruit covering, and partly because the rind oil was contaminated with pectin from the albedo and other substances including some of the albedo pulp and hull fibers. The rind oil could not be readily or completely separated from this mixture, because of the contaminating substances which tended to emulsify the oil and prevent ready separation of it from the other substances and water or similar liquid which was usually present. Hence, these methods yielded a small amount of rind oil and required considerable expense in recovery of the oil.

Another method, which has been proposed, was to subject the whole citrus fruit to heavy pressure, thereby squeezing out much of the rind oil, as well as much of the fruit juice. This method possessed most of the disadvantages of the above described method.

The present invention avoids all the disadvantages of the prior proposed methods and possesses the advantage of more or less completely liberating all the rind oil, preventing any material absorption of such oil by the albedo, and providing a mixture of oil and a suitable liquid, such as water, which mixture is sufficiently free from contaminating substances so that substantially all the rind oil may be readily and cheaply separated from the mixture. Thus, the present method is capable of producing a yield of rind oil which is large as compared to the amount produced by prior methods, and is capable of producing this larger yield with less expense in separation of the oil from the mixtures containing it and other liquids, such as water. By this method the yield of oil has thus been greatly increased and the cost of production has been greatly decreased both as compared with prior processes. Moreover, the present method may be carried out on whole fruit without opening the hull or removing any of the fruit juice, and the whole fruit, after extraction of the rind oil, is in a condition for subsequent extraction of the juice in a form which is suitable for the highest grade to which the fruit is suitable before extraction of the rind oil.

Apparatus embodying the present invention differs radically from the apparatus proposed for use with the prior described processes, and is capable of extracting rind oil from whole citrus fruit while leaving the fruit juice cells unopened and unchanged, so that the fruit juice may be subsequently removed as readily as has been done heretofore on whole fruit from which rind oil has not been extracted, thereby making it possible to extract separately rind oil and fruit juice without commingling the same and without contaminating either with substances which would harmfully or disadvantageously affect them.

The present invention will be understood by those skilled in the art from the following detailed description of embodiments thereof, reference being made to the attached drawings, in which, Figure 1 is a side elevation of apparatus embodying the present apparatus invention and with which the present method invention may be practiced;

Figure 2 is a top plan view of the apparatus of Figure 1;

Figure 3 is a transverse cross-sectional view taken on line 3—3 of Figure 2;

Figure 4 is a fragmentary enlarged cross-sectional view taken on line 4—4 of Figure 2; and, Figure 5 is a modified form of apparatus embodying the present apparatus invention and with which the present method invention may be practiced; and, Figure 6 shows a further modified apparatus.

Referring first to Figures 1, 2 and 3, I designates a suitable supporting bed on which rests a framework consisting of cross arms 2 and posts 3 and 4. Posts 3 carry two similar units altho one unit or more than two units may be employed. Only one unit will be described in detail. At their upper ends, one set of posts 3 carries a bearing housing 5, within which a hollow cylindrical shaft 6 is mounted, bearings 7 being located between the housing and the shaft and its detachable ring 8, to facilitate rotation of the shaft within the housing. The ring 8 is provided with a peripheral gear 9 which meshes with a gear 10, the latter gear being driven from a motor or other source of power (not shown) thru shaft 11, gear 12 thereon and gear 13 meshing with gear 12 and connected to gear 10. Rotation of the shaft 11 thus causes rotation of shaft 6. Preferably shaft 11 rotates shaft 6 of each unit.

To the upper end of shaft 6, a circular table 14 is secured for rotation with the shaft. The upper end of the shaft 6 is closed by a plate 6a in the unit at the left hand end of Fig. 1, while shaft 6 is open thruout its length in the unit at the right hand end of Figure 1.

The table 14 of each unit is covered on its top surface with means for opening oil cells of citrus fruit. This means has a roughened or abrading surface and may consist of a thin sheet of metal 14a, preferably stainless steel, having a plurality of short projections 14b extending upwardly, more or less completely covering its entire surface, with a plurality of adjacent small openings thru the sheet, as will be described presently in more detail in connection with Figure 4. The table 14 of each unit is preferably provided with large radially extending openings therethru and with a plurality of smaller holes, as will also be described later.

Posts 4 support, at their upper ends, a framework which may consist of angle irons 15 and 16, the former constituting sides and the latter constituting cross pieces of a framework above each of the tables 14. This framework supports, over each unit, a spider-like structure 17, from which, by means of angles 18 or equivalent means, members 19 may be suspended. These members 19 extend from a short distance above the top of the tables 14 to a point a number of inches thereabove, and preferably are sufficiently high to prevent whole citrus fruit from escaping from the curved path defined by the members 19 and the tables 14 thru which the fruit is intended to travel. The members 19 having a vertical height of six or eight inches near the outer periphery of tables 14, have been found to be sufficiently high when the tables 14 were about 6 feet in diameter and were rotated at about 100 revolutions per minute, but it will be understood that the height of members 19 may be changed as desired.

Members 19 are shown in Figures 2 and 3 each as consisting of a single thickness of thin strip steel curved spirally so as to provide a curved passage defined by the members and tables 14 and extending between the central portion of each table and its outer periphery. Straight pieces 20 of similar strip steel are attached tangentially to the outer turns of each member 19 and extend across the small space between tables 14 where they are most nearly in contact. Members 19 are provided with short projections and holes therethru, substantially like the sheet 14a covering the top surface of tables 14.

Side frame members 15 also support a rind oil receiving pan 21 which extends from housings 5, below tables 14, to well above the top surfaces of the tables, the bottom of this pan being preferably sloped toward the outer extremities thereof, where one or more drain spouts 22 may be located.

As indicated in Figure 3, the bed 1, together with all the apparatus supported thereon, is tilted at a small angle to the horizontal, for a purpose presently to be described.

In Figs. 1 and 2, 23 indicates suitable means such as a chute, thru which whole citrus fruit may be delivered to the left hand table, while 24 indicates a chute thru which fruit delivered from the right hand table 14 may pass. It will be noted from the direction arrows appearing on Figure 2, that the fruit delivered from chute 23 travels outwardly from the central part of the left hand table 14 between turns of members 19, thence between members 20 to the outer periphery of the right hand table 14, and thence between turns of member 19 to the open central portion of the right hand table 14, where the fruit may fall thru the hollow shaft 6 into chute 24. It will be understood, therefore, that the tables 14 preferably rotate in opposite directions, altho they may be rotated in the same direction if desired. It will also be understood that the direction of travel of the fruit may be reversed if desired.

In Figure 1 is shown a pipe 25 and nozzles 26 thru which water or other suitable liquid may be sprayed onto the tops of tables 14 and onto fruit being treated during operation of the apparatus. Any desired number of such nozzles may be used.

Figure 4 shows, fragmentarily, an enlarged section of table 14 and the thin sheet metal covering 14a thereon. This sheet 14a is what is commonly referred to in the trade as "fillet", that is, it is thin sheet or strip steel, a large part of which is provided with a plurality of very short projections 14b usually formed by punching small holes thru the sheet. These projections are sufficiently long to penetrate into the oil cells of citrus fruit but are not long enough to penetrate thru the hull and into the juice cells. The holes are sufficiently large to permit rind oil and other suitable liquid, such as water, to flow therethru, carrying with it such small particles of the rind as may be removed during operation of the machine. Holes 27 extending thru table 14 are provided and each is located under one or more of the small holes 28 of sheet 14a. Larger, generally radially extending holes 29 extend thru table 14, partly to decrease the rotating mass of each table and partly to afford large passages thru which the rind oil and liquid mixed therewith may escape into pan 21. Members 19 and 20 are made of fillet material which is like member 14a.

In Figure 5 is shown a modified form of apparatus embodying the present invention. It consists of a suitable support 30 which carries a rotatable shaft 31 which may be rotated by any suitable means (not shown) and a cylinder 32 preferably composed of thin stainless steel, provided with a plurality of short inwardly extending projections and holes, in other words, fillet material which, however, is thick enough to withstand the impact of fruit thereagainst. A chute 33 serves to deliver whole citrus fruit to the lower end of cylinder 32 while chute 34 serves to convey the fruit away from the upper end of the cylinder. Within cylinder 32 shaft 31 is provided with projections preferably arranged in the form of a helix and defining, with cylinder 32, a curved path for whole fruit to travel thru the cylinder 32. These fins 35 are preferably composed of thin stainless steel with short projections and holes,—in other words, fillet material of the necessary strength. Water or other suitable liquid may be sprayed into the top end of the cylinder 32 from nozzle 36 and rind oil and such liquid may escape thru a spout 37 at the bottom of cylinder 32.

Rotation of shaft 31 in the direction indicated will advance the whole citrus fruit fed into the cylinder 32 thru chute 33 and discharge it at the top of cylinder 32 into trough 34.

My preferred method may be briefly described as including the steps of imparting a high velocity and centrifugal force to whole citrus fruit and advancing it within a limited space wherein it may roll, turn and bounce about, repeatedly bringing the rapidly moving fruit into contact with abutments having projections to open the rind oil cells of the fruit, removing the rind oil thus liberated, delivering the fruit in whole form largely free from rind oil, collecting the rind oil and finally separating it from liquids with which it may be mixed or associated.

In carrying out the method of the present invention with the apparatus of Figs. 1 to 4 inclusive, whole citrus fruit is discharged thru chute 23 onto the central portion of the left hand table 14, while both tables are rotating at a high speed, for example, between about 75 and 100 R. P. M. in the case of a table 6 feet in diameter, cover plate 15 serving to direct the fruit into the space between the first two turns of members 19. Rotation of the table 14 imparts angular velocity and centrifugal force to the fruit and at the same time causes it to travel between turns of member 19. The inclination of the tables permits gravity forces also to act on the fruit. The space between turns of member 19 is greater than the largest size of fruit to be treated, so that the fruit may move and shift about, bounce, turn and roll about various axes within this limited space under the influence of centrifugal and gravity forces, and frictional engagement of the tables and members 19 therewith. As the fruit thus bounces, turns and rolls, within such limited spaces, its velocity is greatly increased and it is repeatedly thrown against, and brought into contact with, the projections on the abutments composed of members 19 and 14a. In this manner substantially all parts of the surface of each fruit is brought into contact repeatedly with the projections 14b and the oil cells are thereby opened to release the rind oil. The fruit which has progressed to the outer periphery of left hand table 14 is transferred to the outer periphery of the right hand table 14 rotating in the opposite direction and is similarly moved to the inner portion of the latter table from which point it escapes thru the hollow shaft 26 into chute 24. When the oil cells are opened, punctured or ruptured by the projections 14b on the fillet material, and the rind oil is released, certain highly volatile constituents thereof immediately escape into the air. Other volatile constituents are released but can be recovered by spraying a suitable liquid, such as water, onto the fruit, tables 14 and members 19 during the time the oil cells are being opened. Such liquid serves to wash the fruit, thus avoiding a prior washing step but principally serves the purpose of washing the rind oil from the opened cells and into the pan 21. Since rind oil and water are not readily miscible, the mixture of oil and water collected in pan 21 may be drawn off and later separated.

An important advantage of the present invention is that substantially all the rind oil may be removed from whole citrus fruit without any substantial loss of such oil by absorption of it by the albedo or white part of the hull or fruit covering; and the rind oil so obtained is capable of ready and inexpensive separation from the water which is used to remove the oil from the open oil cells.

Another important advantage is that the whole fruit is not affected in such a way that the fruit juice may not be extracted thereafter in any suitable manner and utilized for any purpose for which such juice is suitable.

Another important advantage of the present invention is that it may be carried out on fruit of a wide size range. For example, fruit which is too small in diameter to be cut and reamed for extraction of the juice, according to the first above described prior method, can be treated by this method for removal of the rind oil and later treated for extraction of the fruit juice. This is due to the fact that the rind oil may be extracted by this invention from very small sized fruit as readily as from large sized fruit. Often small fruit has more and better juice than large fruit.

Another important advantage is that the rind oil extracted by this invention is not contaminated with fruit juice, any substantial amount of pectin or other substances which make it difficult or expensive to separate and recover the rind oil from the mixture.

Another advantage of the invention is, the extremely high speed with which rind oil may be extracted from citrus fruits. With apparatus as above described, the oil may be extracted from many hundreds of pieces of fruit per minute and the process may be continuous. No hand labor is required and only a minor amount of personal supervision of the apparatus is needed.

As a result of tests made to determine the amount of rind oil remaining in fruit treated according to the present invention, it has been found that practically no recoverable amount of rind oil remained in the fruit hulls after being so treated.

The apparatus of Figure 4 may be employed to carry out the method of this invention. The fruit delivered into the bottom of cylinder 32 is advanced by fins 35 to the upper end of the cylinder and meanwhile is confined within the spaces defined by the fins 35 and cylinder 32 within which the whole fruit may turn, roll, bounce and proceed at high velocity under centrifugal, gravity and frictional forces, striking against the abutments consisting of the cylinder and the fins with considerable force and with resultant opening of the oil cells. Liquid sprayed into the cylinder by nozzles 36 serves to wash the rind from the opened cells and to condense or entrap some of the less highly volatile constituents of the oil, this mixture of oil and water being collected as thru spout 37 in a form from which the oil may be readily separated. The fruit discharged from the top of cylinder 32 is suitable for extracting the juice therefrom.

Altho adapted for continuous operation of the process, the apparatus of Figs. 1 to 3 may be readily altered for batch operation. It is only necessary to use the left hand unit and to replace members 19 by one or more concentric circular members 38 composed of similar material, one of which is disposed near the periphery of the table 14, and to remove member 20. Such apparatus is shown in Fig. 6. The operation of such device is as follows: A number of whole citrus fruits is placed on the table 14 which, during rotation, imparts velocity and centrifugal and frictional forces to the whole fruit thus resulting in opening of the oil cells.

Having thus described my invention so that those skilled in the art may be able to understand and practice the same, what I desire to secure by Letters Patent is defined in what is claimed.

What is claimed is:

1. The method of extracting rind oil from citrus fruits which includes the steps of continuously moving whole citrus fruit in a stream through a path of travel at high velocity, causing the fruit to be repeatedly thrown and bounced into contact with stationary oil cell opening abutments in said path, without causing the fruit to be continuously pressed against the abutments to tear the rind therefrom, while turning the fruit to bring substantially its entire external area into contact with the abutments, thereby opening the rind oil cells in the fruit and liberating the rind oil therefrom without removing the hull from the fruit, continuously collecting the rind oil from the thus opened cells and continuously discharging from the path in whole form the fruit from which the rind oil has thus been removed.

2. The method of extracting rind oil from citrus fruits which includes the steps of continuously moving whole citrus fruit in a stream through a curved path of travel at high velocity, subjecting the fruit to centrifugal force and causing it to be repeatedly thrown and bounced into contact with stationary oil cell opening abutments in said path, without causing the fruit to be continuously pressed against the abutments to tear the rind therefrom, while turning the fruit to bring substantially its entire external area into contact with the abutments, thereby opening the rind oil cells in the fruit and liberating the rind oil therefrom without removing the hull from the fruit, continuously collecting the rind oil from the thus opened cells, and continuously discharging from the path in whole form the fruit from which the rind oil has thus been removed.

3. The method of extracting rind oil from citrus fruits which includes the steps of rapidly moving the whole fruit along a curved path having stationary side walls, while causing free-rolling and bouncing movement of the fruit in its path, and repeatedly bringing the fruit into instantaneous contact with oil cell opening projections on the walls of the path with sufficient force to puncture the rind oil cells of the fruit and liberate the rind oil therefrom without tearing the hull from the fruit, and thereby imparting frictional forces to the fruit to turn the same and bring substantially its entire external area into contact with the projections, discharging the liberated rind oil and discharging the fruit in whole form from the path.

4. The method of extracting rind oil from citrus fruits which includes the steps of imparting high velocity to the fruit and moving the same within walls defining a path of travel, said path being defined in part by stationary walls, causing the fruit to be rotated on various axes and to be repeatedly thrown and bounced into contact with oil cell opening abutments on at least one of said walls during such movement without continuously pressing the fruit against the abutments to tear the rind therefrom, whereby substantially the entire external area of the fruit is brought into contact with the abutments thereby opening the rind oil cells in the fruit and liberating the rind oil therefrom, discharging the liberated rind oil from the thus opened cells, and discharging from the path in whole form the fruit from which the rind oil has thus been removed.

5. The method of extracting rind oil from citrus fruits which includes the steps of imparting high velocity to the fruit and moving the same within walls defining a path of travel, said path being defined in part by stationary walls, causing the fruit to be rotated on various axes and to be repeatedly thrown and bounced into contact with oil cell opening abutments on at least one of said walls during such movement without continuously pressing the fruit against the abutments to tear the rind therefrom, whereby substantially the entire external area of the fruit is brought into contact with the abutments, thereby opening the rind oil cells in the fruit and liberating the rind oil therefrom, spraying liquid onto the fruit to wash away the thus liberated rind oil, collecting the mixture of liquid and rind oil, and discharging from the path in whole form the fruit from which the rind oil has thus been removed.

6. Apparatus for extracting rind oil from whole citrus fruits which includes movable and stationary means forming an enclosure having walls defining a path of travel for the whole fruit, the walls of said enclosure being spaced transversely of said path a distance materially greater than the largest dimension of the fruit being treated, said path of travel of the fruit between said walls being unobstructed to permit the fruit to move freely therein, rind oil cell opening projections on said means, said projections being of a length sufficient to penetrate the rind oil cells of the fruit but being of insufficient length to penetrate the juice cells of the fruit, means for moving said movable means to carry the fruit through its path of travel at high velocity to cause it to be repeatedly thrown and bounced in said enclosure into oil cell opening contact with said projections, the fruit being thereby repeatedly turned to bring substantially its entire external area into contact with said projections, and means for discharging the rind oil thus liberated by said projections.

7. Apparatus for extracting rind oil from whole citrus fruit which includes rotatable and stationary means forming an enclosure having bottom and side walls defining a curved path of travel for the whole fruit, the walls of said enclosure being spaced transversely of said path of travel a distance materially greater than the largest dimension of the fruit being treated, said path of travel of the fruit between said walls being unobstructed to permit the fruit to move freely therein, oil cell opening projections on said means along said path of travel, said projections being of sufficient length to penetrate the rind oil cells of the fruit but of insufficient length to penetrate the juice cells of the fruit, and means for imparting high velocity to said rotatable means to carry the fruit through its path of travel while subjecting it to centrifugal force and causing it to be repeatedly thrown and bounced in said enclosure into oil cell opening contact with said projections, the fruit being thereby repeatedly turned to bring substantially its entire external area into contact with said projections, and means for collecting the rind oil thus liberated by said projections.

8. Apparatus for extracting rind oil from whole citrus fruit which includes a rotatable table having oil cell opening projections on the surface thereof, stationary means having oil cell opening projections thereon, said stationary means having walls defining with said table a curved path of travel for the whole fruit, said walls being spaced transversely of said path of travel a distance materially greater than the largest dimension of the fruit being treated, and said path of travel of the fruit between said walls being unobstructed to permit the fruit to move freely therein, and means for rotating said table, thereby to impart high velocity to the whole fruit thereon and to subject said fruit to centrifugal force and move it along said path and freely between said walls into oil cell opening contact with said projections.

9. Apparatus for extracting rind oil from whole citrus fruit which includes a rotatable table having oil-cell-opening projections thereon, a stationary member disposed above the table having oil-cell-opening projections thereon and being curved spirally to define, together with the table, a curved path of travel for the whole fruit which path is larger in cross section than the largest dimension of the fruit to be treated, said path of travel of the whole fruit being unobstructed to permit the fruit to move freely therein, means for rotating said table to impart to whole fruit thereon a high velocity and to move it along said path and into oil-cell-opening contact with said projections, and means for collecting the rind oil liberated from the fruit by said projections.

10. Apparatus for extracting rind oil from whole citrus fruit which includes two rotatable tables having oil-cell-opening projections on their surfaces, stationary members disposed over the tables and shaped to form, together with the tables, a curved path of travel for whole citrus fruit, within which the fruit may have a limited movement, said stationary members having oil-cell-opening projections thereon, stationary means connecting the path of one table with the path of the other table so that whole citrus fruit may pass from one table to the other, said path of travel of the whole fruit being unobstructed to permit the fruit to move freely therein, means to deliver whole citrus fruit to one of the tables, means by which whole citrus fruit may be discharged from the other table, means to rotate the tables and thereby to impart movement to whole citrus fruit thereon and to bring about contact of the whole fruit and said projections with oil-cell-opening force, and means for collecting the rind oil liberated from the fruit by said projections.

11. Apparatus for extracting rind oil from whole citrus fruit which includes two adjacent rotatable tables having oil-cell-penetrating projections on their top surfaces, stationary members disposed over each table, said stationary members extending spirally between the central and outer parts of each table to define curved paths of larger cross-sectional area than the maximum dimensions of the whole fruit to be treated, said stationary members having oil-cell-penetrating projections thereon, stationary means connecting the curved stationary members where the tables are closely adjacent to each other, said means serving to connect the path over one table with the corresponding path over the other table, said paths being unobstructed to permit the whole fruit to move freely therein, means to deliver whole citrus fruit onto the top of one table, means to discharge whole fruit from the top of the other table, means for rotating the tables to advance the whole citrus fruit along said path at high velocity and thereby to bring such fruit and said projections into contact with oil-cell-opening force, and means for collecting the rind oil liberated from the fruit by said projections.

12. Apparatus for extracting rind oil from whole citrus fruit which includes two adjacent rotatable tables having oil-cell-penetrating projections on their top surfaces, stationary members disposed over each table, said stationary members extending spirally between the central and outer parts of each table to define curved paths of larger cross-sectional area than the maximum dimensions of the whole fruit to be treated, said stationary members having oil-cell-penetrating projections thereon, stationary means connecting the curved stationary members where the tables are closely adjacent to each other, said means serving to connect the path over one table with the corresponding path over the other table, said paths being unobstructed to permit the whole fruit to move freely therein, means to deliver whole citrus fruit onto the top of the first table, means to discharge whole fruit from the top of the second table, means for rotating the tables to advance the whole citrus fruit along said path at high velocity, thereby to bring such fruit and said projections into oil-cell-opening contact, means for spraying liquid onto the fruit while traversing said path to wash the rind oil away from the open cells, and means for collecting the mixture of rind oil and liquid.

13. Apparatus for extracting rind oil from whole citrus fruit which includes adjacent rotatable tables having oil-cell-opening projections on their top surfaces, stationary members disposed over each of said tables, each such member curving spirally between the central part and the outer part of each table and serving to define the sides of a path of travel for whole citrus fruit on the table; said stationary members having oil-cell-opening projections thereon, stationary means joining outer turns of the stationary members where the tables are most closely adjacent, said path of travel being unobstructed to permit the whole fruit to move freely therein, means to rotate said tables in opposite directions, thereby to propel whole citrus fruit at high velocity along said path over one table, thence onto the adjacent table and simultaneously to bring such whole fruit forcibly into oil-cell-opening contact with said projections, and means for collecting the rind oil liberated from the fruit by said projections.

14. Apparatus for extracting rind oil from whole citrus fruit which includes two adjacent rotatable tables having oil-cell-opening projections on their top surfaces, stationary members disposed over each of said tables, each such member curving spirally between the central part and the outer part of each table and serving to define the sides of a path of travel for whole citrus fruit on the table, said stationary members having oil cell opening projections thereon, stationary means tangentially joining outer turns of the two stationary members where the tables are most closely adjacent, said path of travel being unobstructed to permit the whole fruit to move freely therein, means to rotate said tables in opposite directions, thereby to propel whole citrus fruit at high velocity along said path from the central portion to the outer portion of one table, thence onto the outer portion of the other table and to the central portion of the latter table, and simultaneously to bring such whole fruit into oil-cell-opening contact with said projections under centrifugal force, means for spraying water onto the fruit and tables while the whole fruit is traversing said path, and means for collecting the mixture of water and rind oil.

15. Apparatus for extracting rind oil from whole fruits comprising a pair of tables positioned adjacent to one another, means for rotating said tables, enclosure forming members disposed over the tables and shaped to form therewith an enclosure having walls defining a path of travel for the fruit around each table and from one table to the other, said path of travel of the whole fruit between said walls being unobstructed to permit the fruit to move freely therein, means on one of said walls for puncturing the rind cells of the fruit to release rind oil therefrom while said tables are carrying the fruit through its path of travel, and means for discharging the rind oil thus released from the fruit by said means.

16. Apparatus for extracting rind oil from whole fruits comprising a plurality of tables positioned adjacent to one another, means for rotating said tables, enclosure forming members disposed over the tables and shaped to form therewith an enclosure defining a path of travel for the fruit around each table and from the table to another, said path of travel of the whole fruit being unobstructed to permit the fruit to move freely therein, rind cell puncturing projections on the upper surfaces of said tables for releasing oil from the rind cells of the fruit while said tables are carrying the fruit through its path of travel, and means for collecting the rind oil released by said projections.

17. Apparatus for extracting rind oil from whole fruits comprising a plurality of successive tables positioned adjacent to one another, means for rotating adjacent tables in opposite directions, enclosure forming members disposed over the tables and shaped to form therewith an enclosure having walls defining a path of travel for the fruit around each table and from the periphery of one table to the periphery of the succeeding table, said path of travel of the whole fruit between said walls being unobstructed to permit the fruit to move freely therein, means on one of said walls for puncturing the rind cells of the fruit to release rind oil therefrom while said tables are carrying the fruit through its path of travel, and means for collecting the rind oil released from the fruit by said means.

18. Apparatus for extracting rind oil from whole fruits comprising a table, enclosure forming members disposed over the table and shaped to form therewith an enclosure having walls defining a path of travel for the fruit around said table, the walls of said enclosure being spaced transversely of said path a distance materially greater than the largest dimension of the fruit being treated, a plurality of oil cell opening projections on one of said walls throughout a substantial extent of said path, said path of travel of the whole fruit between said walls being unobstructed to permit the fruit to move freely therein, means for rotating said table to carry the fruit through its path of travel and roll it freely in said enclosure bringing substantially the entire surface of the whole fruit into oil cell opening contact with said projections, and means for collecting the rind oil extracted from the fruit by said projections.

19. Apparatus for extracting rind oil from whole citrus fruits which includes movable and stationary means forming an enclosure having walls defining a path of travel for the whole fruit, the walls of said enclosure being spaced transversely of said path a distance materially greater than the largest dimension of the fruit being treated, said path of travel of the fruit between said walls being unobstructed to permit the fruit to move freely therein, rind oil cell opening projections on said means, said projections being of a length sufficient to penetrate the rind oil cells of the fruit but being of insufficient length to penetrate the juice cells of the fruit, means for moving said movable means to carry the fruit through its path of travel at high velocity to cause it to be repeatedly thrown and bounced in said enclosure into oil cell opening contact with said projections, the fruit being thereby repeatedly turned to bring substantially its entire external area into contact with said projections, means for spraying liquid onto the fruit during its movement through said path to wash the rind oil from the opened cells of the fruit, and means for collecting the mixture of rind oil and liquid.

JOHN MILLS.